US006828976B2

(12) United States Patent
Butcher

(10) Patent No.: US 6,828,976 B2
(45) Date of Patent: Dec. 7, 2004

(54) METHOD AND APPARATUS FOR HARDWARE ACCELERATION OF GRAPHICAL FILL IN DISPLAY SYSTEMS

(75) Inventor: Lawrence L. Butcher, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 112 days.

(21) Appl. No.: 10/206,665

(22) Filed: Jul. 26, 2002

(65) Prior Publication Data

US 2004/0017377 A1 Jan. 29, 2004

(51) Int. Cl.[7] ........................ G06F 15/00; G06F 12/02; G06T 15/00

(52) U.S. Cl. ....................... 345/522; 345/581; 345/501; 345/530; 345/543; 345/549; 345/559; 345/574

(58) Field of Search ................................ 345/418–422, 345/426, 428, 581, 587–589, 593, 597, 600, 501, 522, 530–532, 536–538, 543–545, 549, 556, 559, 533, 535, 547–548, 552, 555, 561–562, 564–565, 574

(56) References Cited

U.S. PATENT DOCUMENTS 5,914,724 A * 6/1999 Deering et al. ............. 345/607
6,556,197 B1 * 4/2003 Van Hook et al. .......... 345/419

* cited by examiner

*Primary Examiner*—Kee M. Tung
*Assistant Examiner*—Wesner Sajous
(74) *Attorney, Agent, or Firm*—Martine & Penilla, LLP

(57) ABSTRACT

Embodiments of the present invention are directed to a method and apparatus for hardware acceleration of graphical fill in display systems. In one embodiment, a bit-mask is maintained. The bit-mask, termed the "filled color bitmap", has one bit for each pixel of the display data. A register, termed the "filled color register", capable of storing a single color value is maintained. When a write command is executed to fill a portion of the display memory with the same value that is stored in the filled color register, the bits in the filled color bitmap corresponding to the portion of display memory are set equal to 1. In executing other writes, the value is written to display memory and the bits in the filled color bitmap corresponding to the portion of display memory are set equal to 0. In one embodiment, the bitmap is located in a dynamic random access memory (DRAM).

26 Claims, 16 Drawing Sheets

METHOD AND APPARATUS FOR HARDWARE ACCELERATION OF GRAPHICAL FILL IN DISPLAY SYSTEMS

BACKGROUND OF THE INVENTION

1. Field of the Invention

The present invention relates to the field of computer displays, and in particular to a method and apparatus for hardware acceleration of graphical fill in display systems.

Sun, Sun Microsystems, the Sun logo, Solaris and Java are trademarks or registered trademarks of Sun Microsystems, Inc. in the United States and other countries.

2. Background Art

A typical graphics system has a controller and display memory. The controller executes graphics commands, including writing data to and reading data from the display memory. Some graphics systems use synchronous graphics random access memory (SGRAM) for display memory. SGRAM contains logic to perform some commands internally. For example, SGRAM executes a command to fill a region of memory with a constant by storing one or two colors from a command source. Then, SGRAM accepts command words consisting of individual bits (i.e., part of a bit-mask) selecting between the stored colors. SGRAM writes one or the other of the colors as instructed to by the bit-mask.

SGRAM is more expensive than dynamic random access memory (DRAM). As a result, many graphics systems use DRAM instead of SGRAM to reduce cost. However, since DRAM lacks the logic to perform some commands internally, graphics systems using DRAM are typically slower than graphics systems using SGRAM. This problem can be better understood by a discussion of display systems in a multi-tier application architecture.

Multi-Tier Application Architecture

In the multi-tier application architecture, a client communicates requests to a server for data, software and services, for example, and the server responds to the requests. The server's response may entail communication with a database management system for the storage and retrieval of data.

The multi-tier architecture includes at least a database tier that includes a database server, an application tier that includes an application server and application logic (i.e., software application programs, functions, etc.), and a client tier. The data base server responds to application requests received from the client. The application server forwards data requests to the database server.

The client tier typically consists of a computer system that provides a graphic user interface (GUI) generated by a client, such as a browser or other user interface application. Conventional browsers include Internet Explorer and Netscape Navigator, among others. The client generates a display from, for example, a specification of GUI elements (e.g., a file containing input, form, and text elements defined using the Hypertext Markup Language (HTML)) and/or from an applet (i.e., a program such as a program written using the JavaTM programming language, or other platform independent programming language, that runs when it is loaded by the browser).

Further application functionality is provided by application logic managed by application server in application tier. The apportionment of application functionality between client tier and application tier is dependent upon whether a "thin client" or "thick client" topology is desired. In a thin client topology, the client tier (i.e., the end user's computer) is used primarily to display output and obtain input, while the computing takes place in other tiers (i.e., away from the thin client). A thick client topology, on the other hand, uses a more conventional general purpose computer having processing, memory, and data storage abilities. The database tier contains the data that is accessed by the application logic in the application tier. A database server in the database tier manages the data, its structure and the operations that can be performed on the data and/or its structure.

The application server can include applications such as a corporation's scheduling, accounting, personnel and payroll applications, for example. The application server also manages requests for the applications that are stored therein. The application server can also manage the storage and dissemination of production versions of application logic. The database server manages the database(s) that manage data for applications. The database server responds to requests to access the scheduling, accounting, personnel and payroll applications' data, for example.

A connection is used to transmit data between client tier, application tier, and may also be used to transfer the application logic to client tier. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. The connection between the application server and the database server represents the transmission of requests for data and the responses to such requests from applications that reside in the application server.

Elements of the client tier, application tier and database tier (e.g., the client, the application server, and the database server) may execute within a single computer. However, in a typical system, elements of the client tier, application tier and database tier may execute within separate computers interconnected over a network such as a LAN (local area network) or WAN (wide area network).

Display Systems

Display systems in the multi-tier application architecture are used to arrange display information for presentation to a user on a display device (e.g., a monitor). Typically, a display system comprises display memory and a display controller in the client tier. The display memory is frequently DRAM and contains pixel color information for each pixel of the display device. The display controller updates the data in the display memory and retrieves data from the display memory to send to the display device.

Typically, thousands, millions or even billions of color value possibilities are available for storage in each display memory location. Frequently, however, the same one or two values are found in many locations. For example, displaying a graphic of a stop sign results in a large number of the display memory locations storing the same value for red. In another example, a text window having a black background and white text results in a large number of display memory locations storing either the value for black or the value for white.

Individually reading and writing each display memory location having the same value is inefficient. SGRAM is sometimes used to speed up graphical fills of one or two colors. The SGRAM uses stored color values, bit-masks and internal logic to perform graphical fills more quickly (typically 2 to 10 times more quickly) than graphical fills using DRAM in typical graphics systems. However, SGRAM is significantly more expensive than DRAM.

SUMMARY OF THE INVENTION

Embodiments of the present invention are directed to a method and apparatus for hardware acceleration of graphical fill in display systems. In one embodiment of the present invention, a bit-mask is maintained. In one embodiment, the bit-mask, termed the "filled color bitmap", has one bit for each pixel of the display data. In another embodiment, a register, termed the "filled color register", capable of storing a single color value is maintained.

In one embodiment, all values in the filled color bitmap are initialized to 0. When a write command is executed to fill a portion of the display memory with the same value that is stored in the filled color register, the value is not written to display memory. Instead, the bits in the filled color bitmap corresponding to the portion of display memory are set equal to 1. Similarly, when a write command is executed to fill a portion of the display memory with a different value from the value stored in the filled color register, the value is written to display memory and the bits in the filled color bitmap corresponding to the portion of display memory are set equal to 0.

In one embodiment, display data is read in parallel from the display memory and the filled color bitmap. When a bit in the filled color bitmap is 1, the value stored in the filled color register is used for the corresponding pixel rather than the value in display memory. When a bit in the filled color bitmap is 0, the value stored in display memory is used for the corresponding pixel.

In one embodiment, the filled color bitmap is physically smaller than the display memory used to store graphics data. The filled color bitmap uses fewer bits to represent each pixel than does the display memory. In one embodiment, the filled color bitmap is placed inside the graphics controller chip. Since the filled color bitmap is on-chip, it can be updated and read very quickly. The quicker reads and writes improve the speed of the display system without incurring the cost associated with the use of SGRAM.

In another embodiment, the filled color bitmap is on a separate chip. Since the filled color bitmap is smaller than the display memory, it can be updated and scanned more quickly than the display memory. The quicker reads and writes improve the speed of the display system without incurring the cost associated with the use of SGRAM.

In yet another embodiment, the filled color bitmap is located in the same chip as the display memory. The filled color bitmap is located in its own partition of the display memory chip. Since the filled color bitmap is smaller than the display memory, it can be updated and scanned more quickly than the display memory. The quicker reads and writes improve the speed of the display system without incurring the cost associated with the use of SGRAM.

In a further embodiment, the color bitmap and the display memory are both comprised of dynamic random access memory (DRAM) or memories.

In one embodiment, color values are written from the filled color bitmap to the display memory as a background task in the graphics chip. When the graphics controller is not busy executing other commands, it scans the fill color bitmap. When a 1 bit is found in the filled color bitmap, the value in the filled color register is written to the display memory. After the write is done, the bit in the filled color bitmap is set to 0. When all bits in the filled color bitmap are 0, the filled color register is available to store another value to enable a fast fill with a different color.

In one embodiment, Min-X, Max-X, Min-Y and Max-Y registers are maintained. The registers record the area of the screen containing 1s in the filled color bitmap. When the area containing 1s is less than the total area of the screen, less of the filled color bitmap must be scanned. Thus, the graphics controller is able to scan for 1s in the filled color bitmap more quickly.

In one embodiment, a low-resolution filled color bitmap is maintained. Each memory location of the low-resolution filled color bitmap corresponds to more than one pixel. In one embodiment, each memory location of the low-resolution filled color bitmap corresponds to a 4 pixel by 4 pixel square. In another embodiment, each memory location of the low-resolution filled color bitmap corresponds to a 16 pixel horizontal area. In other embodiments, each memory location of the low-resolution filled color bitmap corresponds to different numbers and configurations of pixels.

In one embodiment, a bit in the low-resolution filled color bitmap is equal to 1 whenever at least one corresponding bit in the filled color bitmap is equal to 1. If the low-resolution bitmap bit value is 0, all corresponding bits in the filled color bitmap are also 0. Thus, a region corresponding to a low-resolution filled color bitmap bit value of 0 does not need to be scanned for 1s. Thus, when at least one bit value in the low-resolution filled color bitmap is 0, the graphics controller is able to scan for 1s in the filled color bitmap more quickly.

In another embodiment, more than one low-resolution bitmap is maintained. In one embodiment, the memory locations of the multiple low-resolution bitmaps cover different amounts of pixels in a hierarchical manner.

In one embodiment, a running count of how many bits are "1" in the filled color bitmap is maintained. The count is incremented whenever a bit changes from 0 to 1 and decremented whenever a bit changes from 1 to 0. When the count is equal to zero, there are no 1s in the filled color bitmap and scanning for 1s in the filled color bitmap is stopped.

In one embodiment, when data is read from display memory, the contents of the filled color bitmap is prefetched. Pixels corresponding to a filled color bitmap memory location storing a value of 1 do not have their color value read from the display memory. Instead such pixels have their color value read from the filled color register. As a result, the graphics system performs more quickly and with less power consumption.

In one embodiment, the filled color bitmap has more than 1 bit for each pixel. In one embodiment, the filled color bitmap has 2 bits per pixel, and the display system has 3 filled color registers. When a value matching any of the 3 color values stored in the filled color registers is to be written to display memory, the binary code representing the appropriate filled color register is written to the filled color bitmap memory location corresponding to the pixel. One pattern in the 2-bit binary code (e.g., 00) indicates that the written color value is not stored in any filled color register and should be read from display memory.

In one embodiment, block transfers of one region of graphics data to another region of graphics data are accomplished using the filled color bitmap. When the region being transferred consists only of pixels with color values stored in the filled color registers, the block transfer is executed in the filled color bitmap. The values stored in the receiving region of the filled color bitmap are set equal to the values stored in the transferring region of the filled color bitmap. Thus, display memory is not accessed or altered. Since references to the filled color bitmap are much faster than references to display memory, significant speed-up of some operations (e.g., scrolling operations applied to text windows) is achieved.

In one embodiment, a graphics system has a plurality of filled color registers corresponding to vertical regions of the display data. A single filled color bitmap serves several different partially overlapping windows with different foreground and background colors. In one embodiment, the boundary between vertical regions is determined dynamically, based on graphics command activities. In another embodiment, a memory scanning technique is used to clear bits out of the filled color bitmap and enable the boundary to be moved whenever the count of 1s in a region becomes 0.

In one embodiment, software is used to monitor and record the details of the commands executed by the graphics controller chip. The software determines which are the best colors to put into the filled color registers in order to maximize performance.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for hardware acceleration of graphical fill in display systems. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Hardware Acceleration of Graphical Fills

In one embodiment of the present invention, a bit-mask is maintained. In one embodiment, the bit-mask, termed the "filled color bitmap," has one bit for each pixel of the display data. In another embodiment, a register, termed the "filled color register," capable of storing a single color value is maintained.

In one embodiment, all values in the filled color bitmap are initialized to 0. When a write command is executed to fill a portion of the display memory with the same value that is stored in the filled color register, the value is not written to display memory. Instead, the bits in the filled color bitmap corresponding to the portion of display memory are set equal to 1. Similarly, when a write command is executed to fill a portion of the display memory with a different value from the value stored in the filled color register, the value is written to display memory and the bits in the filled color bitmap corresponding to the portion of display memory are set equal to 0.

Figure 1:
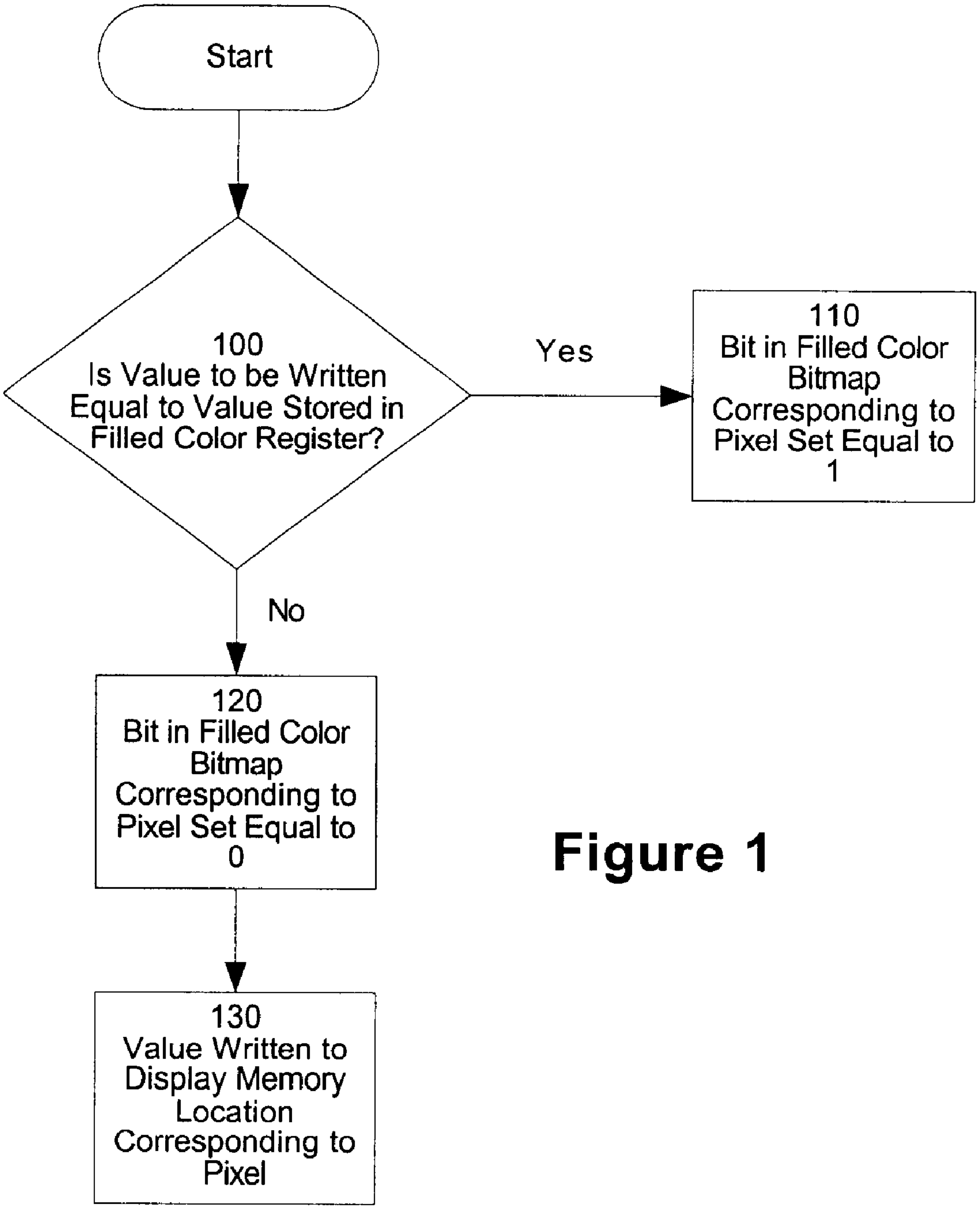
FIG. 1 is a flow diagram of the process of writing display data for a pixel in accordance with one embodiment of the present invention.

FIG. 1 illustrates the process of writing display data for a pixel in accordance with one embodiment of the present invention. At block 100, it is determined whether the value to be written for the pixel is equal to the value stored in the filled color register. If the value to be written for the pixel is equal to the value stored in the filled color register, at block 110, the bit in the filled color bitmap corresponding to the pixel is set equal to 1. If the value to be written for the pixel is not equal to the value stored in the filled color register, at block 120, the bit in the filled color bitmap corresponding to the pixel is set equal to 0. At block 130, the value is written to the display memory location corresponding to the pixel.

Reading Pixel Color Data

In one embodiment, display data is read in parallel from the display memory and the filled color bitmap. When a bit in the filled color bitmap is 1, the value stored in the filled color register is used for the corresponding pixel rather than the value in display memory. When a bit in the filled color bitmap is 0, the value stored in display memory is used for the corresponding pixel.

Figure 2:
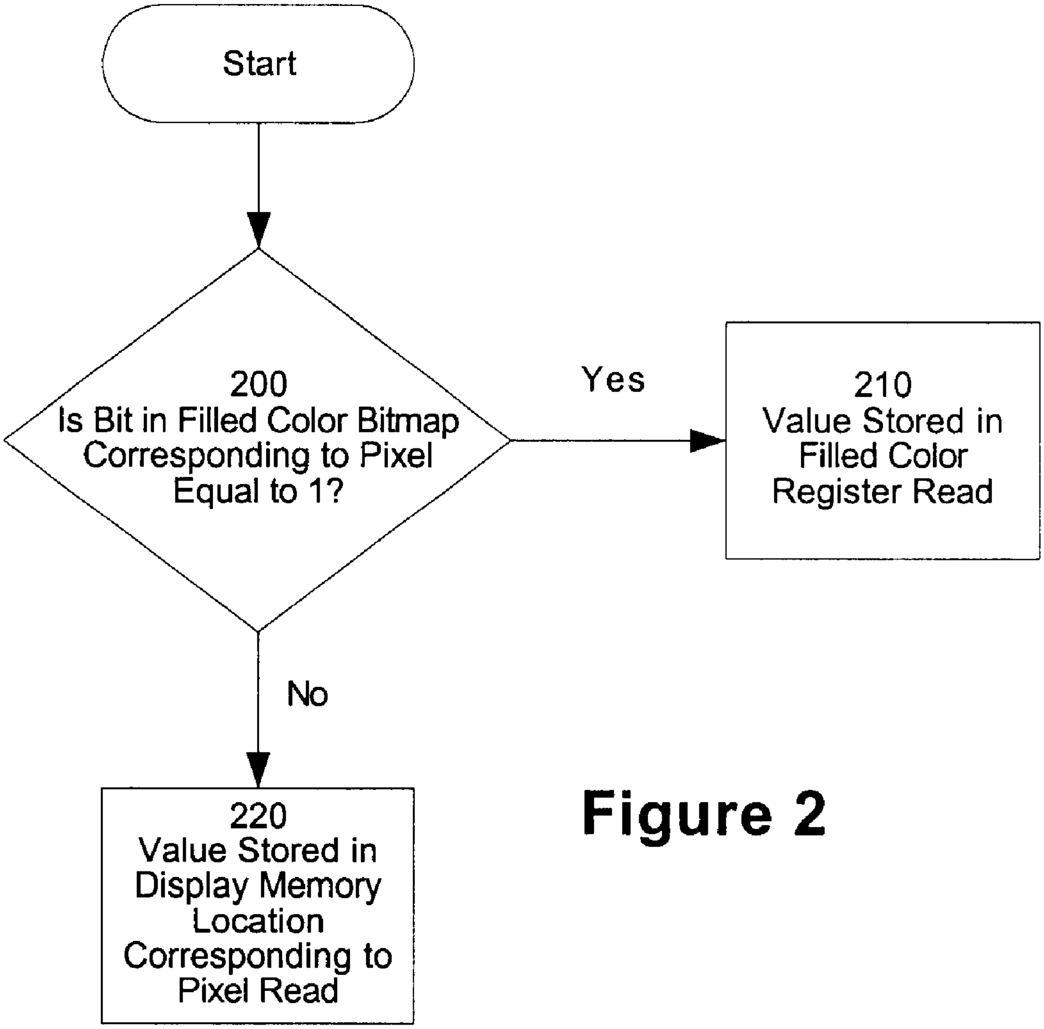
FIG. 2 is a flow diagram of the process of reading display data for a pixel in accordance with one embodiment of the present invention.

FIG. 2 illustrates the process of reading display data for a pixel in accordance with one embodiment of the present invention. At block 200, it is determined whether a bit in the filled color bitmap corresponding to a pixel is equal to 1. If the bit in the filled color bitmap corresponding to the pixel is equal to 1, at block 210, the value stored in the filled color register is read. If the bit in the filled color bitmap corresponding to the pixel is not equal to 1, at block 220, the value stored in the display memory location corresponding to the pixel is read.

In one embodiment, when data is read from display memory, the contents of the filled color bitmap is pre-fetched. Pixels corresponding to a filled color bitmap memory location storing a value of 1 do not have their color value read from the display memory. Instead such pixels have their color value read from the filled color register. As a result, the graphics system performs more quickly and with less power consumption.

Filled Color Bitmap Location

In one embodiment, the filled color bitmap is physically smaller than the display memory used to store graphics data. The filled color bitmap uses fewer bits to represent each pixel than does the display memory. In on embodiment, the filled color bitmap is placed inside the graphics controller chip. Since the filled color bitmap is on-chip, it can be updated and read very quickly. The quicker reads and writes improve the speed of the display system without incurring the cost associated with the use of SGRAM.

Figure 3:
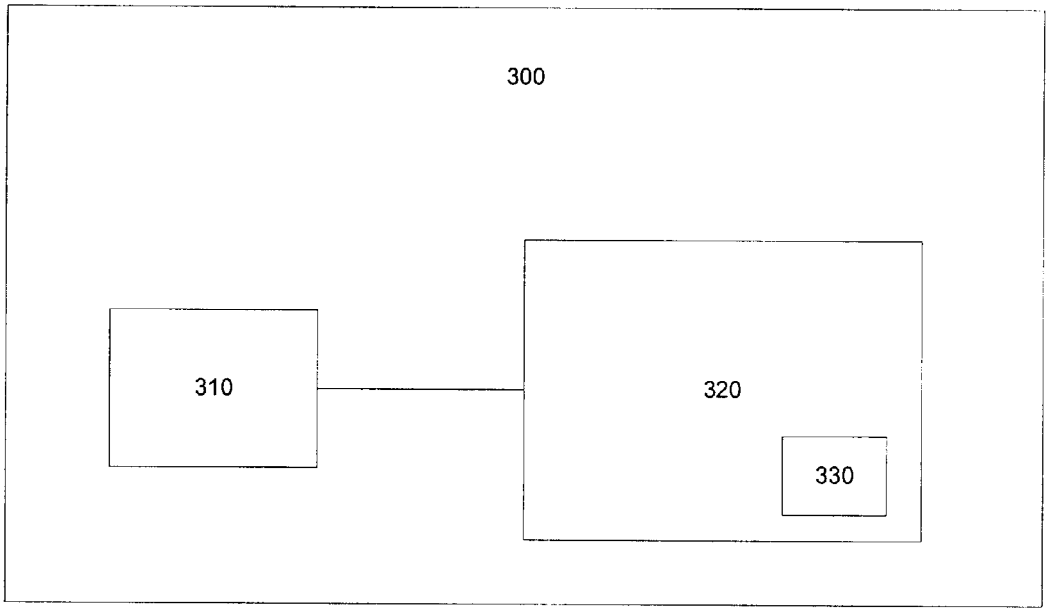
FIG. 3 is a block diagram of a display system in accordance with one embodiment of the present invention.

FIG. 3 illustrates a display system in accordance with one embodiment of the present invention. The display system 300 has a display memory 310 coupled to a graphics processor chip 320. The graphics processor chip has a filled color bitmap 330. Having the filled color bitmap on the graphics processor chip allows the graphics processor chip to quickly access the filled color bitmap at the same time it accesses the display memory.

In another embodiment, the filled color bitmap is on a separate chip. Since the filled color bitmap is smaller than the display memory, it can be updated and scanned more quickly than the display memory. The quicker reads and writes improve the speed of the display system without incurring the cost associated with the use of SGRAM.

Figure 4:
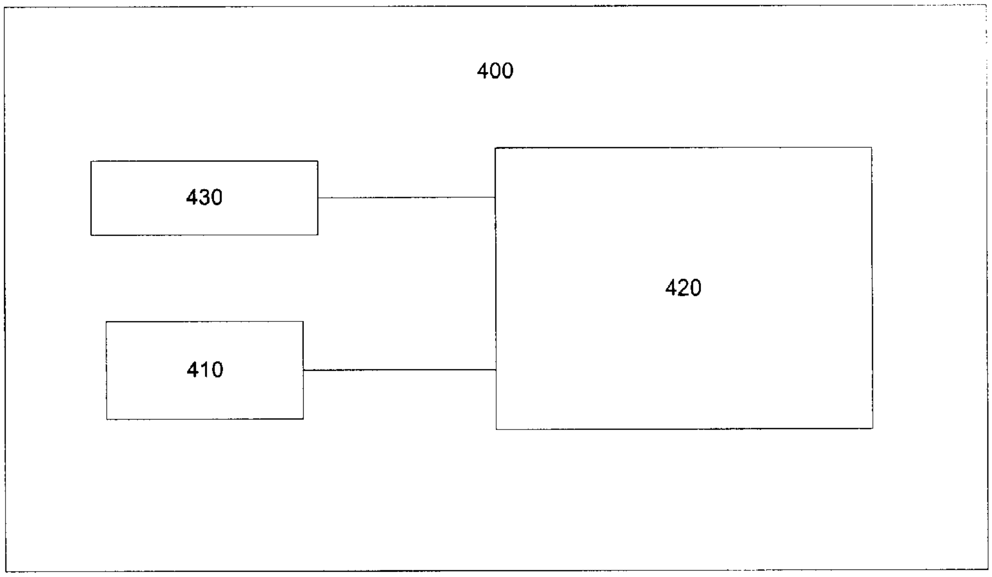
FIG. 4 is a block diagram of a display system in accordance with one embodiment of the present invention.

FIG. 4 illustrates a display system in accordance with one embodiment of the present invention. The display system 400 has a display memory 410 coupled to a graphics processor chip 420. The graphics processor chip is also coupled to a filled color bitmap 430. The graphics processor chip is able to access the filled color bitmap at the same time it accesses the display memory.

In yet another embodiment, the filled color bitmap is located in the same chip as the display memory. The filled color bitmap is located in its own partition of the display memory chip. Since the filled color bitmap is smaller than the display memory, it can be updated and scanned more quickly than the display memory. The quicker reads and writes improve the speed of the display system without incurring the cost associated with the use of SGRAM.

In a further embodiment, the color bitmap and the display memory are both comprised of dynamic random access memory (DRAM) or memories.

Figure 5:
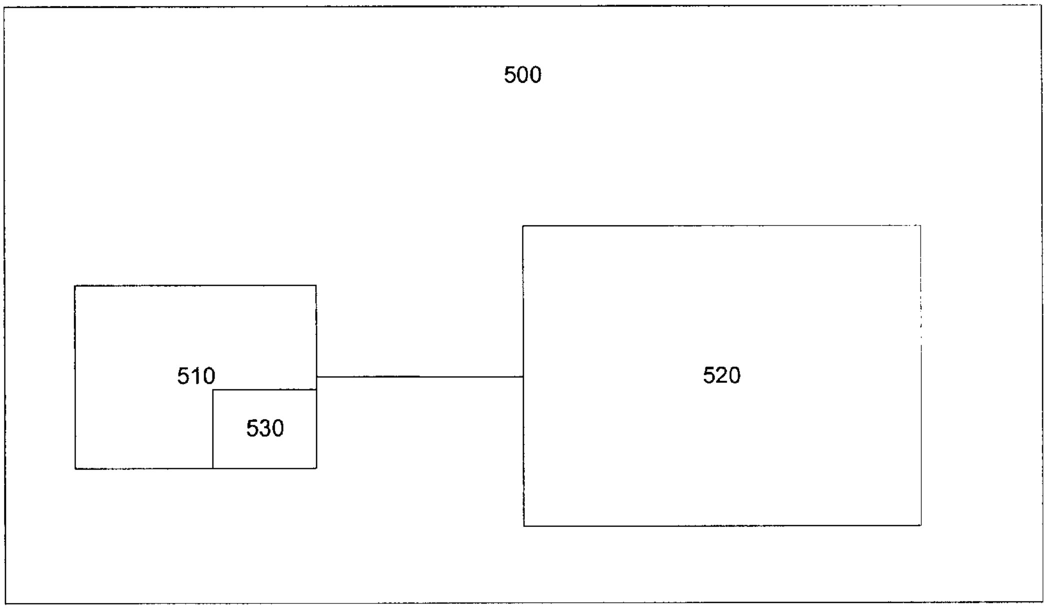
FIG. 5 is a block diagram of a display system in accordance with one embodiment of the present invention.

FIG. 5 illustrates a display system in accordance with one embodiment of the present invention. The display system 500 has a display memory 510 coupled to a graphics processor chip 520. The display memory has an area reserved for a filled color bitmap 530. Since the location of the filled color bitmap is known, only the space reserved for filled color bitmap need be scanned to access the filled color bitmap. Similarly, the area occupied by the filled color bitmap is not scanned when accessing display memory.

Background Writes from Filled Color Bitmap to Display Memo

In one embodiment, color values are written from the filled color bitmap to the display memory as a background task in the graphics chip. When the graphics controller is not busy executing other commands, it scans the fill color bitmap. When a 1 bit is found in the filled color bitmap, the value in the filled color register is written to the display memory. After the write is done, the bit in the filled color bitmap is set to 0. When all bits in the filled color bitmap are 0, the filled color register is available to store another value to enable a fast fill with a different color.

Figure 6:
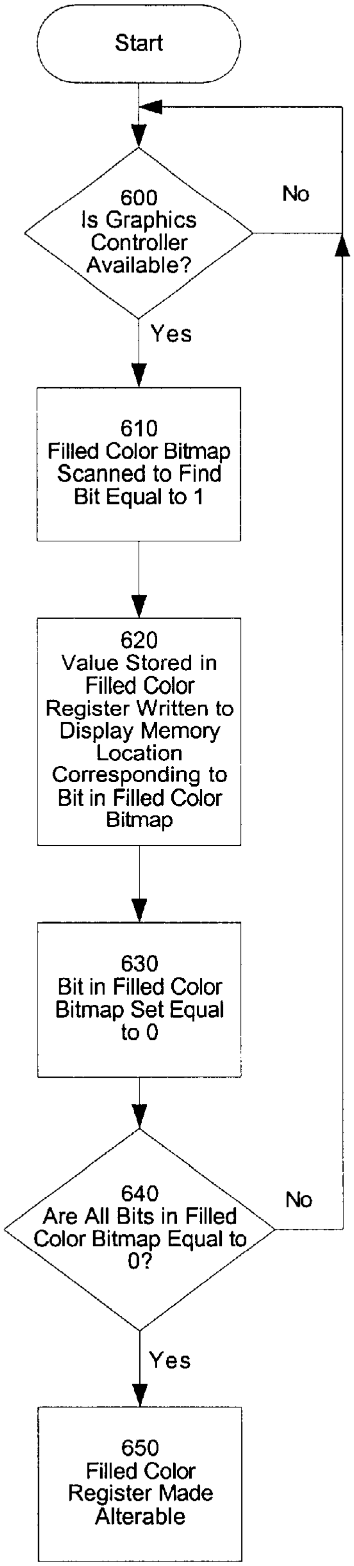
FIG. 6 is a flow diagram of the process of writing color data from the filled color bitmap to the display memory in accordance with one embodiment of the present invention.

FIG. 6 illustrates the process of writing color data from the filled color bitmap to the display memory in accordance with one embodiment of the present invention. At block 600, it is determined whether the graphics controller is available to move color data from the filled color bitmap to the display memory. If the graphics controller is not available to move color data from the filled color bitmap to the display memory, the process repeats at block 600. If the graphics controller is available to move color data from the filled color bitmap to the display memory, at block 610, the filled color bitmap is scanned to find a bit equal to 1.

At block 620, the value stored in the filled color register is written to the display memory location corresponding to the bit in the filled color bitmap. At block 630, the bit in the filled color bitmap is set equal to 0. At block 640, it is determined whether all bits in the filled color bitmap are equal to 0. If not all bits in the filled color bitmap are equal to 0, the process repeats at block 600. If all bits in the filled color bitmap are equal to 0, at block 650, the filled color register is made alterable.

In one embodiment, Min-X, Max-X, Min-Y and Max-Y registers are maintained. The registers record the area of the screen containing 1s in the filled color bitmap. When the area containing 1s is less than the total area of the screen, less of the filled color bitmap must be scanned. Thus, the graphics controller is able to scan for 1s in the filled color bitmap more quickly.

In other embodiments, a combination of one, two or three of the Min-X, Max-X, Min-Y and Max-Y registers are maintained. Maintaining fewer registers may result in a larger area being scanned than maintaining all four registers, but may still result in a smaller area being scanned than maintaining none of the registers.

Figure 7:
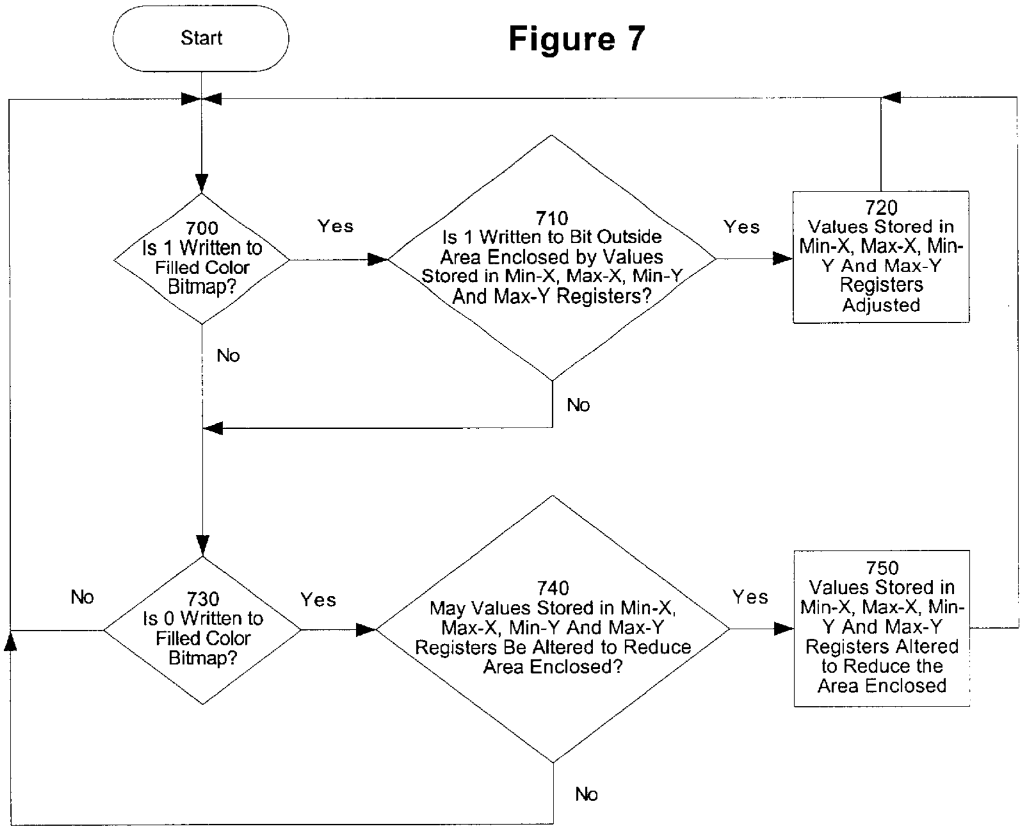
FIG. 7 is a flow diagram of the process of maintaining Min-X, Max-X, Min-Y and Max-Y registers in accordance with one embodiment of the present invention.

FIG. 7 illustrates the process of maintaining Min-X, Max-X, Min-Y and Max-Y registers in accordance with one embodiment of the present invention. At block 700, it is determined whether a 1 is written to the filled color bitmap. If a 1 is written to the filled color bitmap, at block 710, it is determined whether the 1 is written to a bit outside the area enclosed by the values stored in the Min-X, Max-X, Min-Y and Max-Y registers. If the 1 is written to a bit outside the area enclosed by the values stored in the Min-X, Max-X, Min-Y and Max-Y registers, at block 720, the values stored in the Min-X, Max-X, Min-Y and Max-Y registers are adjusted so that the bit is inside the area enclosed by the values stored in the Min-X, Max-X, Min-Y and Max-Y registers and the process repeats at block 700.

If the 1 is not written to a bit outside the area enclosed by the values stored in the Min-X, Max-X, Min-Y and Max-Y registers, the process continues at block 730. If, at block 700, a 1 is not written to the filled color bitmap, the process continues at block 730. At block 730, it is determined whether a 0 is written to the filled color bitmap. If a 0 is written to the filled color bitmap, at block 740, it is determined whether the values stored in the Min-X, Max-X, Min-Y and Max-Y registers may be altered to reduce the area enclosed by the values while still enclosing all bits that are equal to 1.

If the values stored in the Min-X, Max-X, Min-Y and Max-Y registers may be altered to reduce the area enclosed by the values while still enclosing all bits that are equal to 1, at block 750, the values stored in the Min-X, Max-X, Min-Y and Max-Y registers are altered to reduce the area enclosed by the values while still enclosing all bits that are equal to 1 and the process repeats at block 700. If the values stored in the Min-X, Max-X, Min-Y and Max-Y registers may not be altered to reduce the area enclosed by the values while still enclosing all bits that are equal to 1, the process repeats at block 700.

Low-Resolution Filled Color Bitmap

In one embodiment, a low-resolution filled color bitmap is maintained. Each memory location of the low-resolution filled color bitmap corresponds to more than one pixel. In one embodiment, each memory location of the low-resolution filled color bitmap corresponds to a 4 pixel by 4 pixel square. In another embodiment, each memory location of the low-resolution filled color bitmap corresponds to a 16 pixel horizontal area. In other embodiments, each memory location of the low-resolution filled color bitmap corresponds to different numbers and configurations of pixels.

Figure 8:
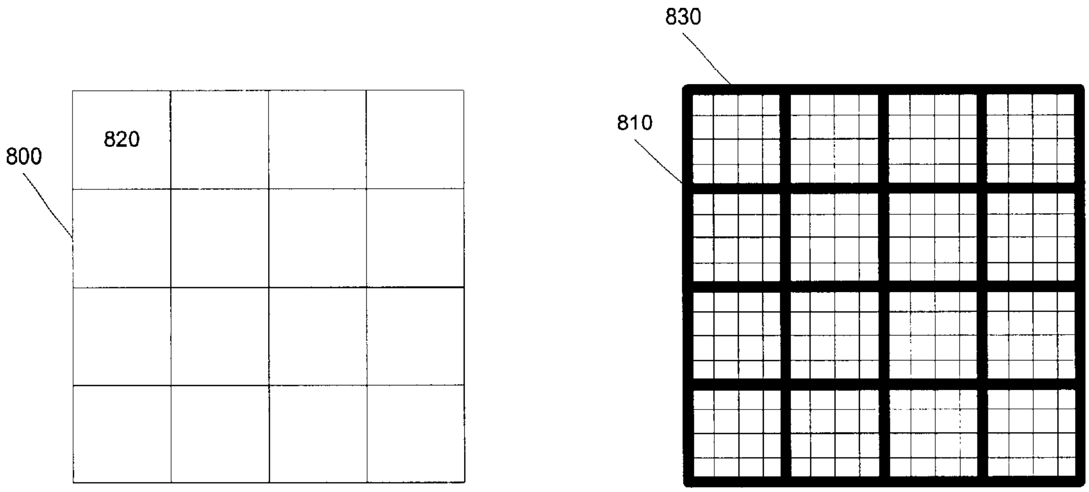
FIG. 8 is a block diagram of a low-resolution filled color bitmap in accordance with one embodiment of the present invention.

FIG. 8 illustrates a low-resolution filled color bitmap in accordance with one embodiment of the present invention. The low-resolution filled color bitmap 800 has 16 data locations. Each data location in the low-resolution filled color bitmap corresponds to a 4 pixel by 4 pixel block of pixels in the display memory 810. For example, data location 820 in the low-resolution filled color bitmap corresponds to 4 pixel by 4 pixel block of pixels 830.

In one embodiment, a bit in the low-resolution filled color bitmap is equal to 1 whenever at least one corresponding bit in the filled color bitmap is equal to 1. If the low-resolution bitmap bit value is 0, all corresponding bits in the filled color bitmap are also 0. Thus, a region corresponding to a low-resolution filled color bitmap bit value of 0 does not need to be scanned for 1s. Thus, when at least one bit value in the low-resolution filled color bitmap is 0, the graphics controller is able to scan for 1s in the filled color bitmap more quickly.

Figure 9:
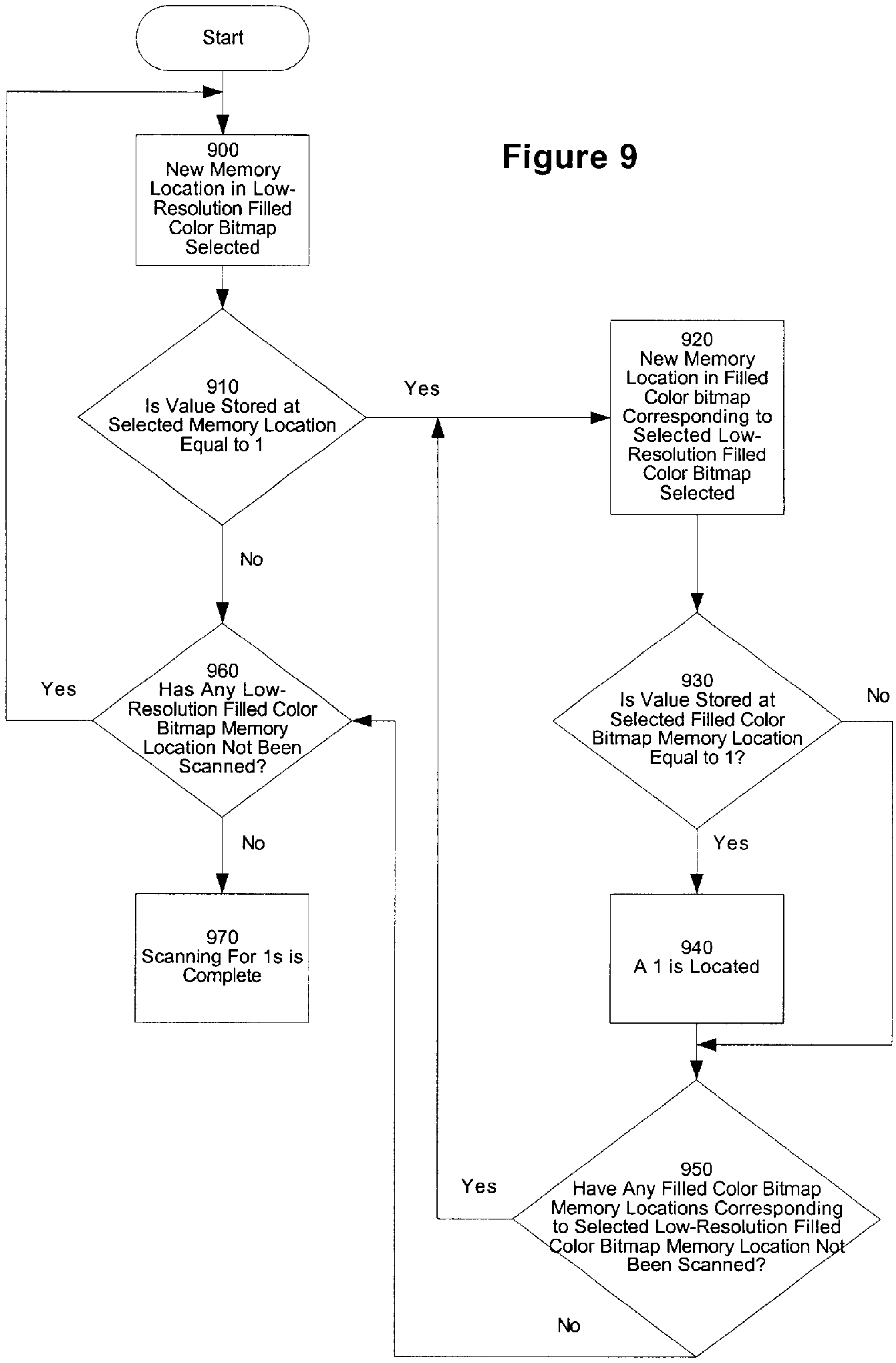
FIG. 9 is a flow diagram of the process of scanning for 1s with a low-resolution filled color bitmap in accordance with one embodiment of the present invention.

FIG. 9 illustrates the process of scanning for 1s with a low-resolution filled color bitmap in accordance with one embodiment of the present invention. At block 900, a new memory location in the low-resolution filled color bitmap is selected. At block 910, it is determined whether the value stored at the selected memory location is equal to 1. If the value stored at the selected memory location is not equal to 1, the corresponding filled memory locations in the filled color bitmap cannot contain 1s, so the process continues at block 960.

If the value stored at the selected memory location is equal to 1, at block 920, a new memory location in the filled color bitmap corresponding to the selected low-resolution filled color bitmap is selected. At block 930, it is determined whether the value stored at the selected filled color bitmap memory location is equal to 1. If the value stored at the selected filled color bitmap memory location is equal to 1, at block 940, a 1 is located and the process continues at block 950. If the value stored at the selected filled 5 color bitmap memory location is not equal to 1, the process continues at block 950.

At block 950, it is determined whether any filled color bitmap memory locations corresponding to the selected low-resolution filled color bitmap memory location have not been scanned. If a filled color bitmap memory locations corresponding to the selected low-resolution filled color bitmap memory location has not been scanned, the process repeats at block 920.

If every filled color bitmap memory locations corresponding to the selected low-resolution filled color bitmap memory location has been scanned, at block 960, it is determined whether any low-resolution filled color bitmap memory location has not been scanned. If a low-resolution filled color bitmap memory location has not been scanned, the process repeats at block 900. If every low-resolution filled color bitmap memory location has been scanned, at block 970, scanning for 1s is complete.

Figure 10:
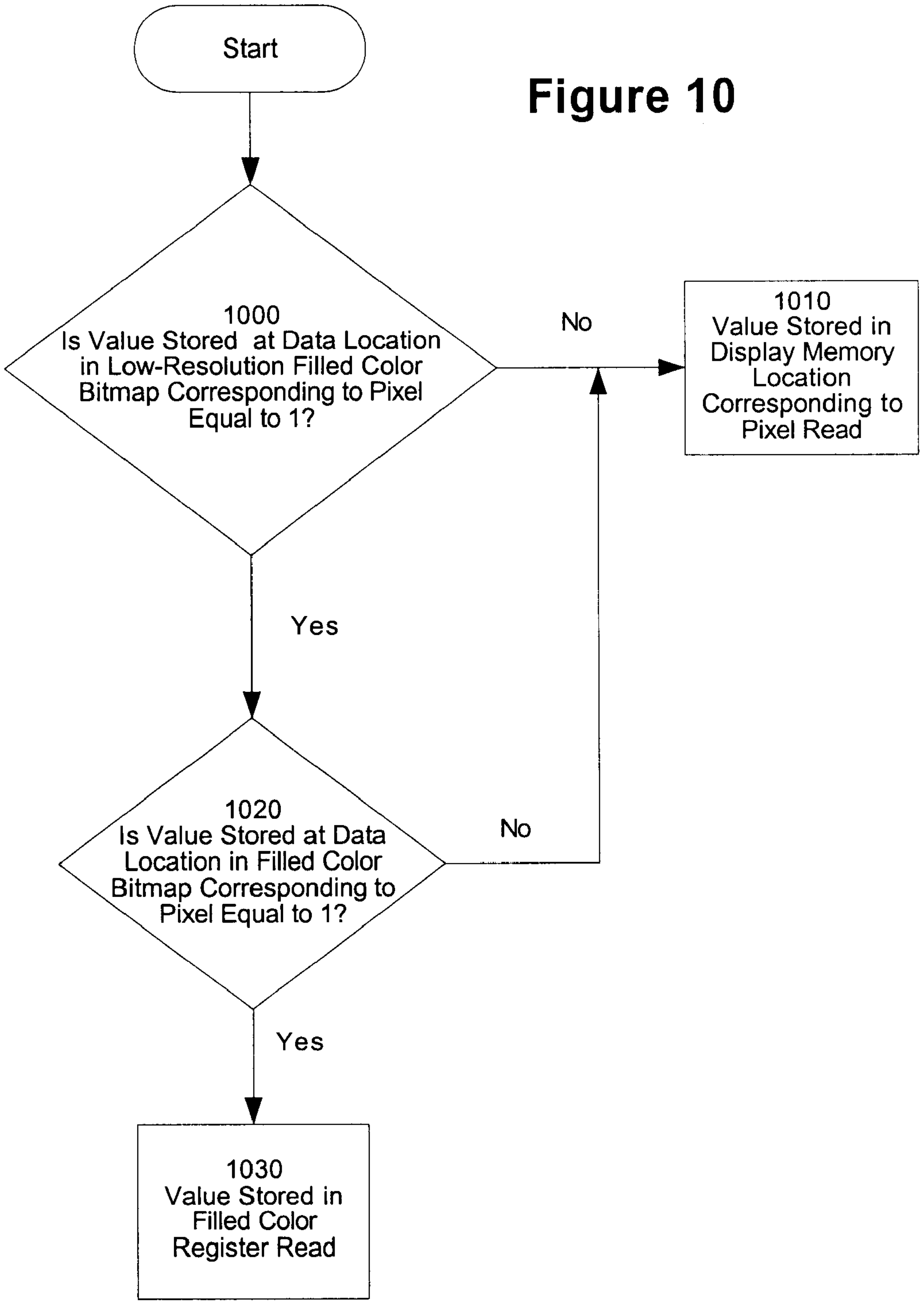
FIG. 10 is a flow diagram of the process of reading color data for a pixel with a low-resolution filled color bitmap in accordance with one embodiment of the present invention.

In one embodiment, a low-resolution filled color bitmap used to speed up the process of reading pixel color data. FIG. 10 illustrates the process of reading color data for a pixel with a low-resolution filled color bitmap in accordance with one embodiment of the present invention. At block 1000, it is determined whether the value stored at the data location in the low-resolution filled color bitmap corresponding to the pixel is equal to 1. If the value stored at the data location in the low-resolution filled color bitmap corresponding to the pixel is not equal to 1, at block 1010, the value stored in the display memory location corresponding to the pixel is read.

If the value stored at the data location in the low-resolution filled color bitmap corresponding to the pixel is equal to 1, at block 1020, it is determined whether the value stored at the data location in the filled color bitmap corresponding to the pixel is equal to 1. If the value stored at the data location in the filled color bitmap corresponding to the pixel is equal to 1, at block 1030, the value stored in the filled color register is read. If the value stored at the data location in the filled color bitmap corresponding to the pixel is not equal to 1, the process continues at block 1010.

In another embodiment, more than one low-resolution filled color bitmap is maintained. In one embodiment, the memory locations of the multiple low-resolution filled color bitmaps cover different amounts of pixels in a hierarchical manner. Since low-resolution filled color bitmaps are smaller than the filled color bitmap, in some embodiments where the filled color bitmap is not located on the graphics controller chip, a low-resolution filled color bitmap is located on the graphics controller chip.

1s Counting

In one embodiment, a running count of how many bits are "1" in the filled color bitmap is maintained. The count is incremented whenever a bit changes from 0 to 1 and decremented whenever a bit changes from 1 to 0. When the count is equal to zero, there are no 1s in the filled color bitmap and scanning for 1s in the filled color bitmap is 25 stopped.

Figure 11:
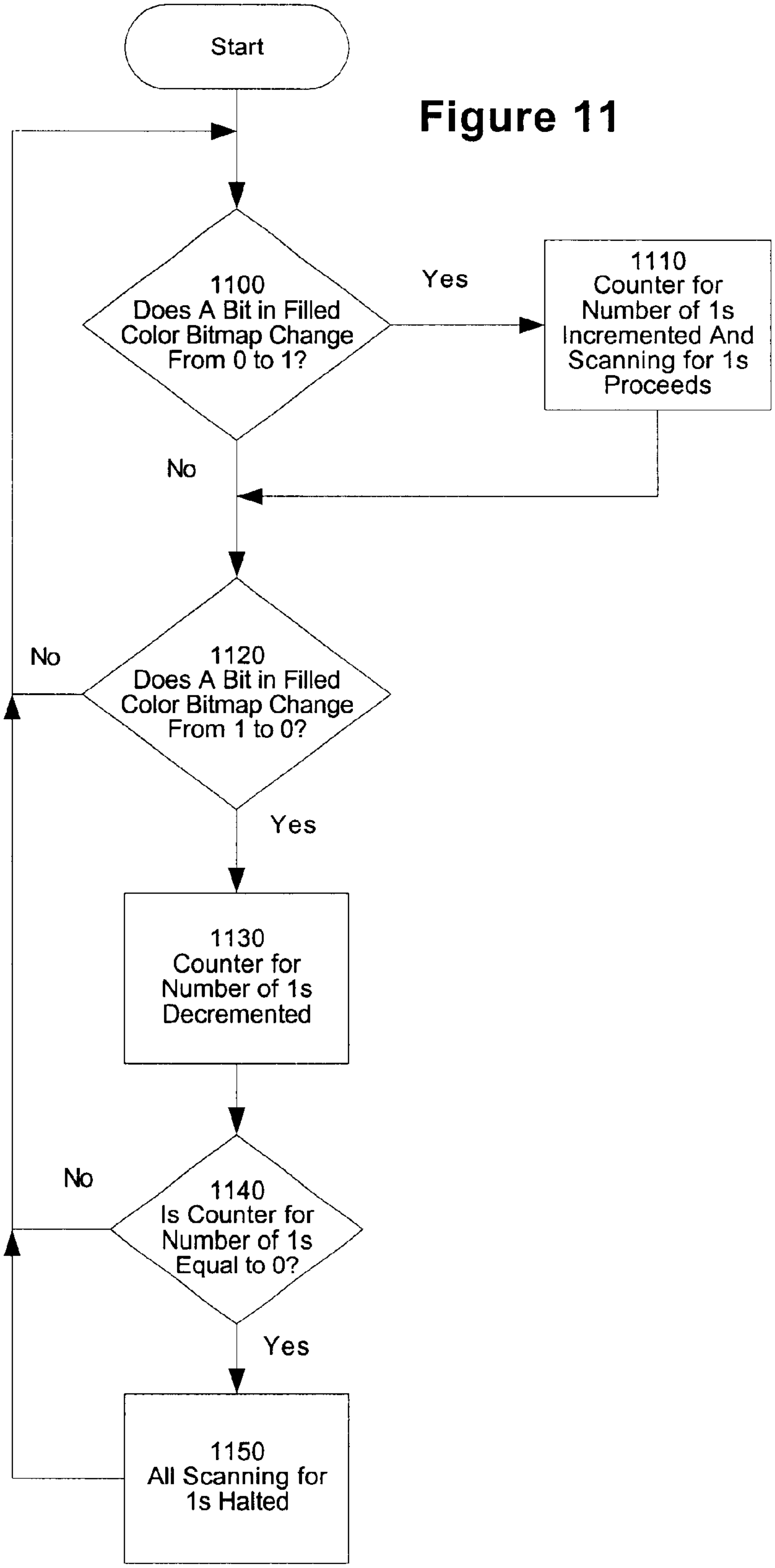
FIG. 11 is a flow diagram of the process of scanning for 1s in accordance with one embodiment of the present invention.

FIG. 11 illustrates the process of scanning for 1s in accordance with one embodiment of the present invention. At block 1100, it is determined whether a bit in the filled color bitmap changes from 0 to 1. If a bit in the filled color bitmap changes from 0 to 1, at block 1110, a counter for the number of 1s is incremented, scanning for 1s proceeds and the process continues at block 1120.

If no bit in the filled color bitmap changes from 0 to 1, at block 1120, it is determined whether a bit in the filled color bitmap changes from 1 to 0. If no bit in the filled color bitmap changes from 1 to 0, the process repeats at block 1100. If a bit in the filled color bitmap changes from 1 to 0, at block 1130, the counter for the number of 1s is decremented. At block 1140, it is determined whether the counter for the number of 1s is equal to 0. If the counter for the number of 1s is equal to 0, at block 1150, all scanning for 1s is halted and the process repeats at block 1100. If the counter for the number of 1s is not equal to 0, the process repeats at block 1100.

Multiple Filled Color Registers

In one embodiment, the filled color bitmap has more than 1 bit for each pixel. In one embodiment, the filled color bitmap has 2 bits per pixel, and the display system has 3 filled color registers. When a value matching any of the 3 color values stored in the filled color registers is to be written to display memory, the binary code representing the appropriate filled color register is written to the filled color bitmap memory location corresponding to the pixel. One pattern in the 2-bit binary code (e.g., 00) indicates that the written color value is not stored in any filled color register and should be read from display memory.

Figure 12:
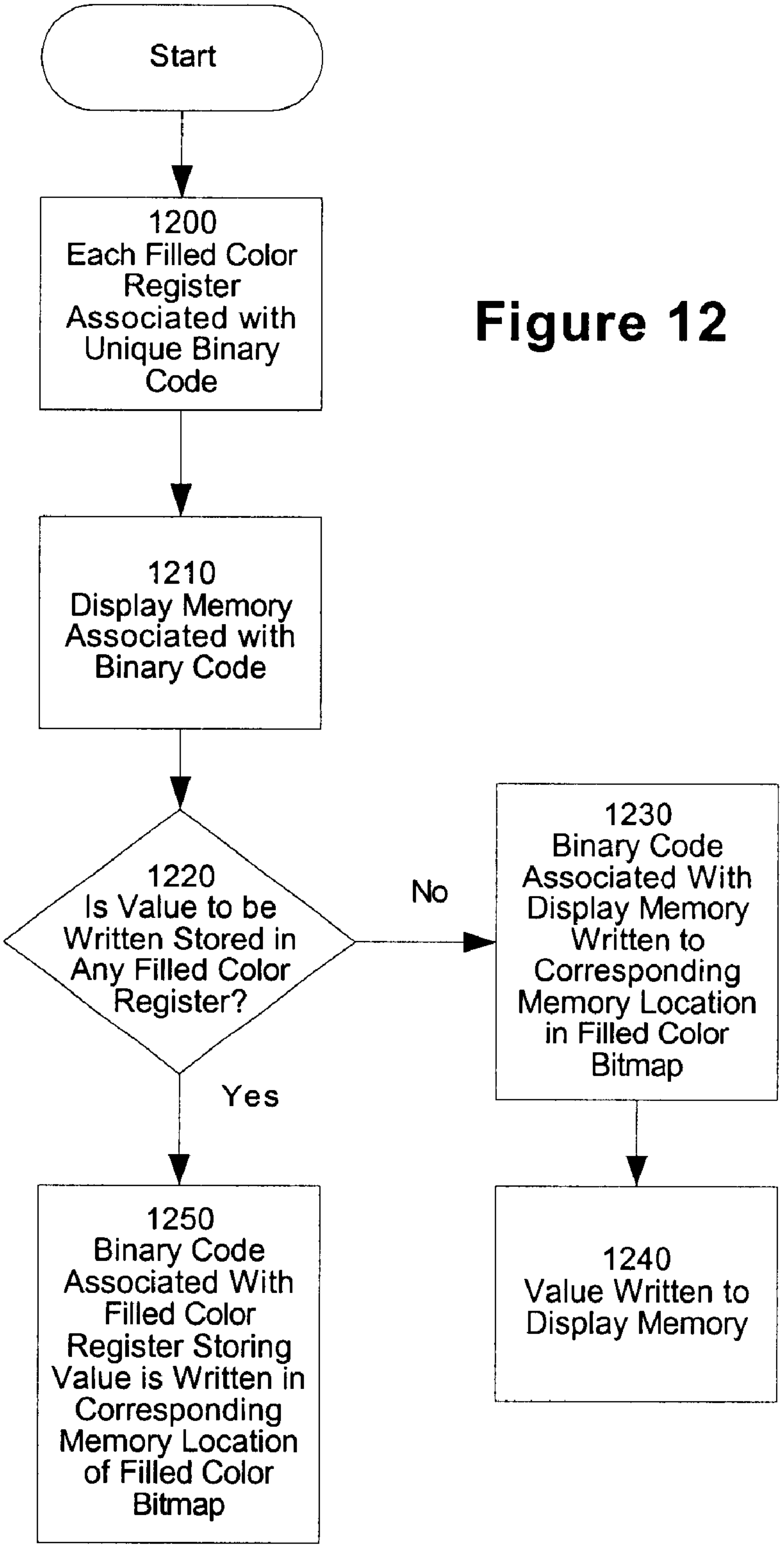
FIG. 12 is a flow diagram of the process of writing data for a pixel with multiple filled color registers in accordance with one embodiment of the present invention.

FIG. 12 illustrates the process of writing data for a pixel with multiple filled color registers in accordance with one embodiment of the present invention. At block 1200, each filled color register is associated with a unique binary code. At block 1210, the display memory is associated with a binary code. At block 1220, it is determined whether the value to be written is stored in any filled color register.

If the value to be written is not stored in any filled color register, at block 1230, the binary code associated with the display memory is written to the corresponding-memory location in the filled color bitmap. At block 1240, the value to be written is then written into the display memory. If the value to be written is stored in any filled color register, at block 1250, the binary code associated with the filled color register storing the value is written in the corresponding memory location of the filled color bitmap (and in this case, the value to be written does not have to be written into the display memory because it is already stored in a filled color register).

Figure 13:
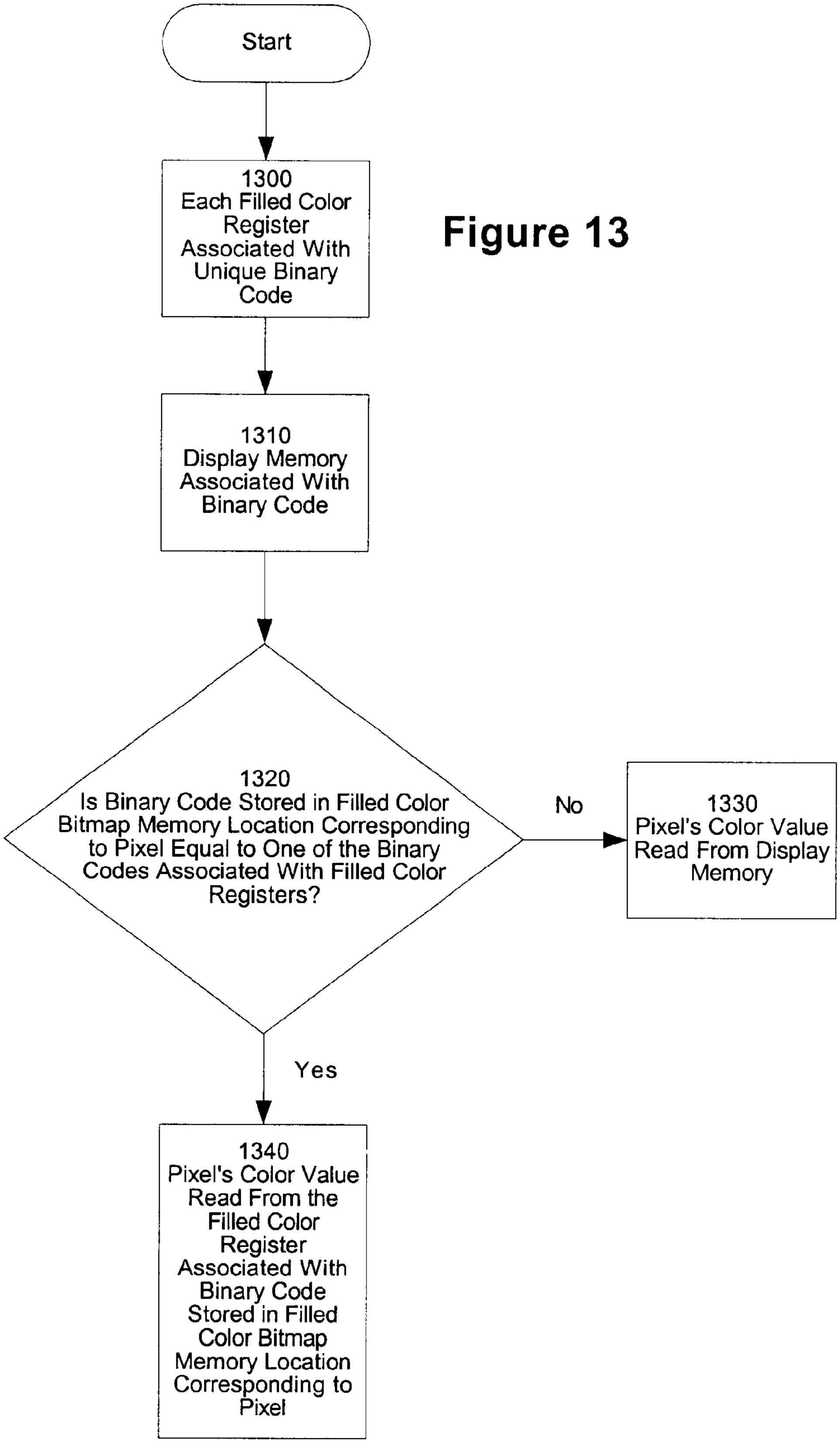
FIG. 13 is a flow diagram of the process of reading data for a pixel with multiple filled color registers in accordance with one embodiment of the present invention.

FIG. 13 illustrates the process of reading data for a pixel with multiple filled color registers in accordance with one embodiment of the present invention. At block 1300, each filled color register is associated with a unique binary code. At block 1310, the display memory is associated with a binary code. At block 1320, it is determined whether the binary code stored in the filled color bitmap memory location corresponding to the pixel is equal to one of the binary codes associated with the filled color registers.

If the binary code stored in the filled color bitmap memory location corresponding to the pixel is not equal to one of the binary codes associated with the filled color registers, at block 1330, the pixel's color value is read from the display memory. If the binary code stored in the filled color bitmap memory location corresponding to the pixel is equal to one of the binary codes associated with the filled color registers, at block 1340, the pixel's color value is read from the filled color register associated with the binary code stored in the filled color bitmap memory location corresponding to the pixel.

Block Transfers in Filled Color Bitmap

In one embodiment, a block transfer command is used for transferring a block of graphics data in one region of the display to another region of the display. Block transfers of graphics data from one region to another region are accomplished using the filled color bitmap. When the graphic data in the region being transferred consists only of pixels with color values stored in the filled color registers, the block transfer is executed in the filled color bitmap. The values stored in the receiving region of the filled color bitmap are set equal to the values stored in the transferring region of the filled color bitmap. Thus, display memory is not accessed or altered. Since references to the filled color bitmap are much faster than references to display memory, significant speed-up of some operations (e.g., scrolling operations applied to text windows) is achieved.

Multiple Regional Filled Color Registers

In one embodiment, a graphics system has a plurality of filled color registers corresponding to regions of the display data. In one embodiment the regions are vertical regions, but other embodiments have other region configurations. A single filled color bitmap serves several different partially overlapping windows with different foreground and background colors. In one embodiment, the boundary between regions is determined dynamically, based on graphics command activities. In another embodiment, a memory scanning technique is used to clear bits out of the filled color bitmap and enable the boundary to be moved whenever the count of 1s in a region becomes 0.

Figure 14:
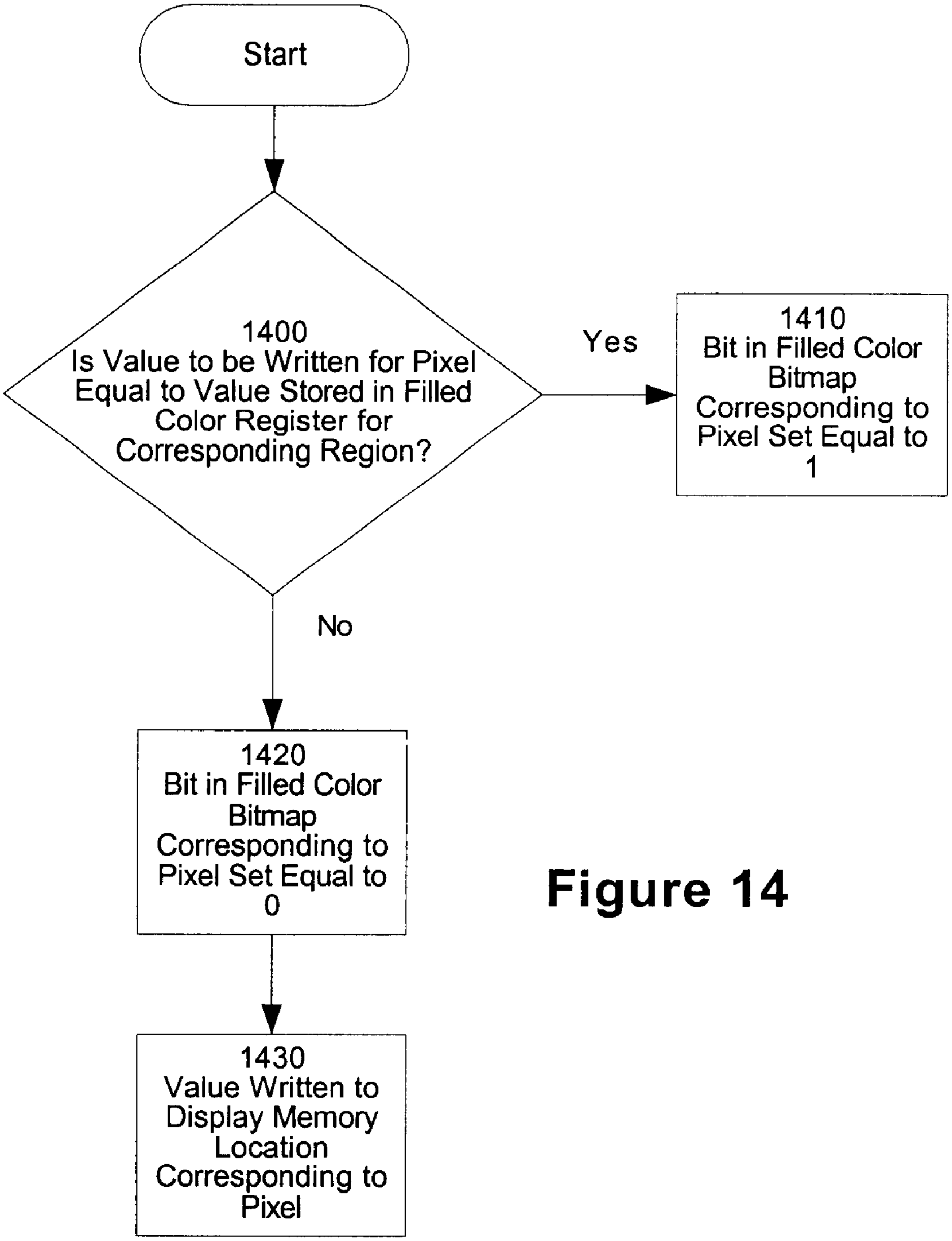
FIG. 14 is a flow diagram of the process of writing color data for a pixel with multiple regional filled color registers in accordance with one embodiment of the present invention.

FIG. 14 illustrates the process of writing color data for a pixel with multiple regional filled color registers in accordance with one embodiment of the present invention. At block 1400, it is determined whether the value to be written for the pixel is equal to the value stored in the filled color register for the corresponding region. If the value to be written for the pixel is equal to the value stored in the filled color register for the corresponding region, at block 1410, the bit in the filled color bitmap corresponding to the pixel is set equal to 1. If the value to be written for the pixel is not equal to the value stored in the filled color register for the corresponding region, at block 1420, the bit in the filled color bitmap corresponding to the pixel is set equal to 0. At block 1430, the value is written to the display memory location corresponding to the pixel.

Figure 15:
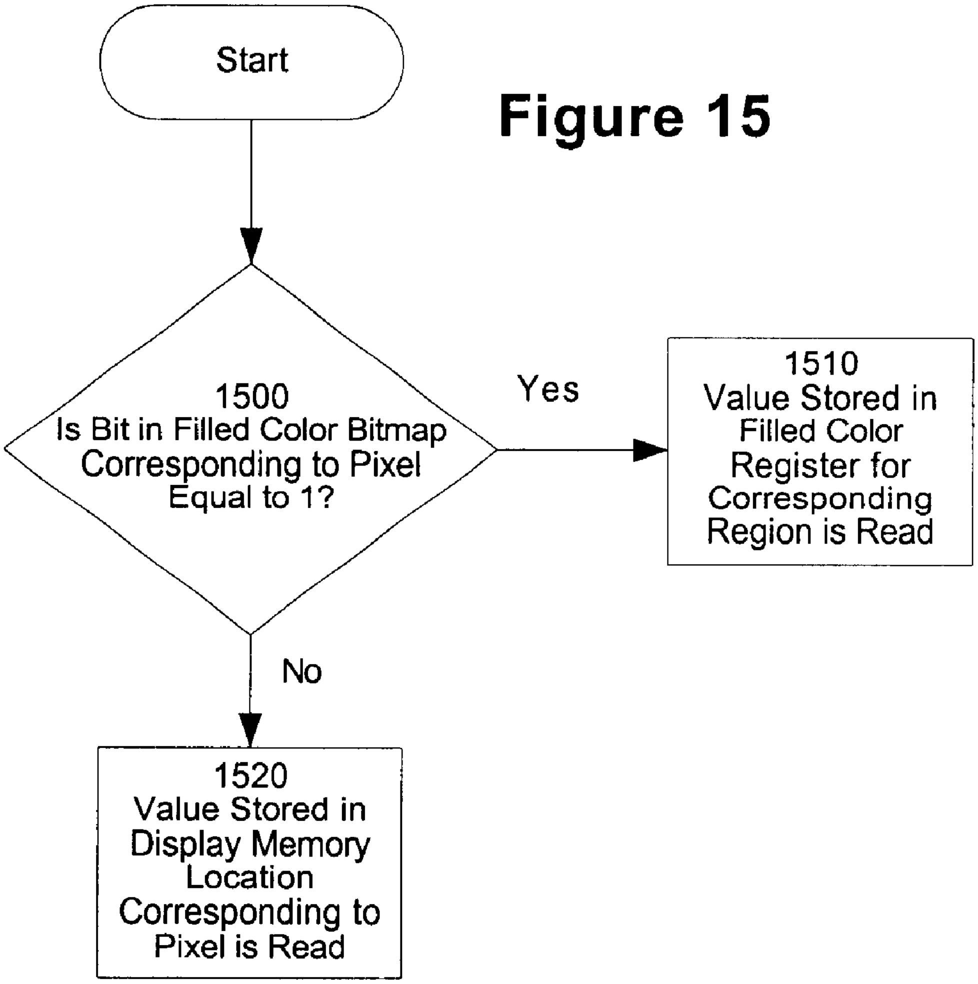
FIG. 15 is a flow diagram of the process of reading color data for a pixel with multiple regional filled color registers in accordance with one embodiment of the present invention.

FIG. 15 illustrates the process of reading color data for a pixel with multiple regional filled color registers in accordance with one embodiment of the present invention. At block 1500, it is determined whether a bit in the filled color bitmap corresponding to a pixel is equal to 1. If the bit in the filled color bitmap corresponding to the pixel is equal to 1, at block 1510, the value stored in the filled color register for the corresponding region is read. If the bit in the filled color bitmap corresponding to the pixel is not equal to 1, at block 1520, the value stored in the display memory location corresponding to the pixel is read.

Filled Color Register Value Selection

In one embodiment, software is used to monitor and record the details of the commands executed by the graphics controller chip. The software determines which are the best colors to put into the filled color registers in order to maximize performance.

Figure 16:
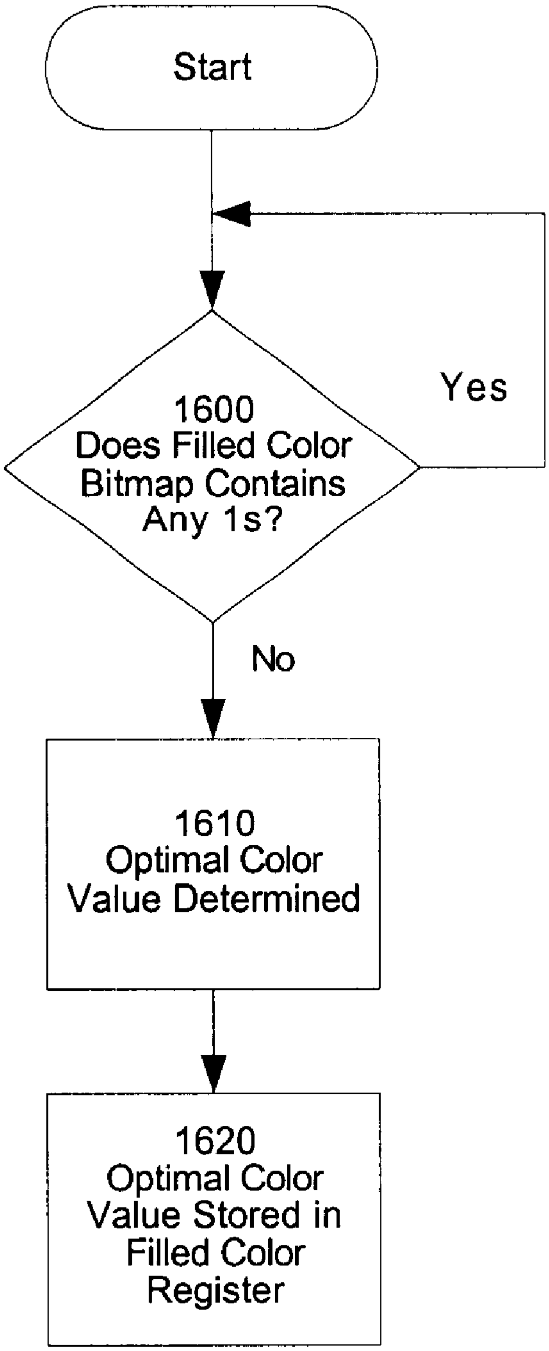
FIG. 16 is a flow diagram of the process of selecting a color for a filled color register in accordance with one embodiment of the present invention.

FIG. 16 illustrates the process of selecting a color for a filled color register in accordance with one embodiment of the present invention. At block 1600, it is determined whether the filled color bitmap contains any 1s. If the filled color bitmap contains any 1s, the process repeats at block 1600. If the filled color bitmap does not contain any 1s, at block 1610, an optimal color value is determined.

In one embodiment, the optimal color value is determined by selecting the most frequently occurring color value. In another embodiments, the optimal color value is determined by other means. At block 1620, the optimal color value is stored in the filled color register.

Thus, a method and apparatus for hardware acceleration of graphical fill in display systems is described in conjunction with one or more specific embodiments. The invention is defined by the following claims and their full scope and equivalents.

What is claimed is:

1. A method of displaying display data comprising:

issuing a display command to a display system;

providing a filled color bitmap, wherein each location of said filled color bitmap has a first number of bits of storage;

providing a filled color register, wherein said filled color register stores a first color value; and using said filled color bitmap and said filled color register in graphical filling;

wherein said step of using comprises:

determining whether said display command is for writing a second color value for a pixel;

storing in a memory location of said filled color bitmap an indication of whether said second color value is equal to said first color value, wherein said memory location is associated with said pixel, if said display command is for writing said second color value for said pixel.

2. The method of claim 1, wherein said step of using further comprises:

writing said second color value to a display memory in response to said display command only if said second color value is different from said first color value.

3. The method of claim 1, wherein said step of using further comprises:

executing a background task of a graphics controller;

writing said first color value to a display memory in response to said background task,if said second color value is equal to said first color value; and altering said indication, if said first color value is written to said display memory in response to said background task.

4. The method of claim 3, wherein said step of executing comprises:

scanning said filled color bitmap.

5. The method of claim 4, wherein said step of scanning comprises:

storing a boundary indicator, wherein said boundary indicator indicates the boundary of a region, wherein said region minimally encloses a desired indicator value in said filled color bitmap; and scanning said region.

6. The method of claim 5, wherein said step of scanning said filled color bitmap further comprises:

altering said boundary indicator, if said region is altered.

7. The method of claim 4, wherein said step of scanning comprises:

maintaining a counter, wherein said counter indicates the number of a desired indicator value in said filled color bitmap; and halting scanning, if said counter is equal to 0.

8. The method of claim 1, wherein said display command is for block transferring one region of graphics data to another region.

9. The method of claim 1, wherein said filled color bitmap is a dynamic random access memory (DRAM).

10. The method of claim 1, wherein said filled color bitmap is located in a region of a display memory.

11. The method of claim 1, wherein said filled color bitmap is located in a separate dynamic access memory (DRAM) chip.

12. The method of claim 1 further comprising:

providing a low-resolution filled color bitmap; and using said low-resolution filled color bitmap in graphical filling.

13. The method of claim 12, wherein said step of using said low-resolution filled color bitmap comprises:

associating a location in said low-resolution filled color bitmap with a plurality of locations in said filled color bitmap; and storing an indicator in said location in said low-resolution filled color bitmap, if said indicator is stored in any of said plurality of locations in said filled color bitmap.

14. The method of claim 12 further comprising:

providing a second low-resolution filled color bitmap; and using said second low-resolution filled color bitmap in graphical filling.

15. The method of claim 1 further comprising:

providing a second filled color register; and using said second filled color register in graphical filling.

16. The method of claim 1, further comprising:

determining an optimal color value; and replacing said first color value with said optimal color value in said filled color register.

17. A method of displaying display data comprising:

issuing a display command to a display system;

providing a filled color bitmap, wherein each location of said filled color bitmap has a first number of bits of storage;

providing a filled color register, wherein said filled color register stores a first color value; and using said filled color bitmap and said filled color register in graphical filling;

wherein said step of using comprises:

determining whether said display command is for reading a color value for a pixel;

retrieving an indicator from a memory location of said filled color bitmap, wherein said indicator indicates whether said color value is stored in said filled color registry;

reading said color value from said filled color registry, if said indicator indicates said color value is stored in said filled color registry; and reading said color value from a display memory, if said indicator indicates said color value is not stored in said filled color registry.

18. A method of displaying display data comprising:

issuing a display command to a display system;

providing a filled color bitmap, wherein each location of said filled color bitmap has a first number of bits of storage;

providing a filled color register, wherein said filled color register stores a first color value;

using said filled color bitmap and said filled color register in graphical filling;

providing a second filled color register; and using said second filled color register in graphical filling;

wherein said step of using said second filled color register comprises:

storing a first indicator in a memory location of said filled color bitmap, wherein said first indicator indicates a color value for a pixel corresponding to said memory location is stored in said filled color register, if said color value for said pixel is stored in said filled color register;

storing a second indicator in said memory location of said filled color bitmap, wherein said second indicator indicates said color value for said pixel is stored in said second filled color register, if said color value for said pixel is stored in said second filled color register; and storing a third indicator in said memory location of said filled color bitmap, wherein said third indicator indicates said color value for said pixel is stored in a display memory, if said color value for said pixel is stored in said display memory.

19. A method of displaying display data comprising:

issuing a display command to a display system;

providing a filled color bitmap, wherein each location of said filled color bitmap has a first number of bits of storage;

providing a filled color register, wherein said filled color register stores a first color value;

using said filled color bitmap and said filled color register in graphical filling;

providing a second filled color register; and using said second filled color register in graphical filling;

wherein said step of using said second filled color register comprises:

associating a first display region with said filled color register;

associating a second display region with said second filled color register;

storing a first indicator in a memory location of said filled color bitmap, wherein said first indicator indicates a color value for a pixel corresponding to said memory location is stored in said filled color register, if said color value for said pixel is stored in said filled color register and said pixel is in said first display region;

storing said first indicator in said memory location of said filled color bitmap, wherein said first indicator indicates said color value for said pixel is stored in said second filled color register, if said color value for said pixel is stored in said second filled color register and said pixel is in said second display region; and storing a second indicator in said memory location of said filled color bitmap, wherein said second indicator indicates said color value for said pixel is stored in a display memory, if said color value for said pixel is stored in a display memory.

20. A data display system comprising:

a means for issuing a display command to a display system;

a filled color bitmap, wherein each location of said filled color bitmap has a first number of bits of storage;

a filled color register, wherein said filled color register stores a first color value; and a graphical filling device configured to use said filled color bitmap and said filled color register in graphical filling;

wherein said graphical filling device comprises:

a determiner configured to determine whether said display command is for writing a second color value for a pixel;

a storage device configured to store in a memory location of said filled color bitmap an indication of whether said second color value is equal to said first color value, wherein said memory location is associated with said pixel, if said display command is for writing said second color value for said pixel;

a writing device configured to write said second color value to a display memory in response to said display command only if said second color value is different from said first color value;

an execution device configured to execute a background task of a graphics controller;

said writing device configured to write said first color value to a display memory in response to said background task of said graphics controller, if said second color value is equal to said first color value; and an alteration device configured to alter said indication, if said first color value is written to said display memory in response to said background task.

21. The data display system of claim 20, wherein said display command further comprises a block move command.

22. The data display system of claim 20, wherein said filled color bitmap is located in a graphics processor chip.

23. The data display system of claim 20, wherein said filled color bitmap is located in a separate chip.

24. The data display system of claim 20 further comprising:

first and second low-resolution filled color bitmaps;

an execution device configured to use said first and second low-resolution filled color bitmaps in graphical filling;

an association unit configured to associate a location in said first and second low-resolution filled color bitmaps with a plurality of locations in said filled color bitmap;

a storage device configured to store an indicator in said location in said first and second low-resolution filled color bitmaps, if said indicator is stored in any of said plurality of locations in said filled color bitmap.

25. The data display system of claim 20, wherein said filled color bitmap is located in a dynamic random access memory (DRAM) chip.

26. The data display system of claim 20, wherein said filled color bitmap is located in a region of a display memory and wherein said display memory is a dynamic access memory (DRAM). value.

* * * * *